United States
Frieder

[11] 4,185,897
[45] Jan. 29, 1980

[54] PROSTHETIC ASPHERIC SPECTACLE LENS FOR APHAKIA

[76] Inventor: Philip M. Frieder, 7441 SW. 145 Ter., Miami, Fla. 33158

[21] Appl. No.: 974,250

[22] Filed: Dec. 29, 1978

Related U.S. Application Data

[63] Continuation-in-part of Ser. No. 831,814, Sep. 9, 1977, abandoned.

[51] Int. Cl.² .......................... G02B 3/04; G02C 7/02
[52] U.S. Cl. ........................................ 351/167; 350/189
[58] Field of Search .............. 351/167, 169; 350/189, 350/192

[56] References Cited
U.S. PATENT DOCUMENTS

| | | | |
|---|---|---|---|
| 3,781,097 | 12/1973 | Bechtold | 351/167 |
| 4,073,578 | 2/1978 | Welsh | 351/167 |

Primary Examiner—John K. Corbin
Assistant Examiner—Scott J. Sugarman
Attorney, Agent, or Firm—Jack E. Dominik

[57] ABSTRACT

A prosthetic, aspheric spectacle lens for aphakic patients comprising a posterior surface and an anterior surface having a spherically curved zone and an aspheric peripheral zone surrounding the central zone. The aspheric peripheral zone has an optimized amount of radially decreasing diopter power. An alternative embodiment has a zone intermediate of the central zone and the peripheral zone. The rate of radially decreasing diopter power change accelerates as the outer circumferential edge of the lens is approached.

16 Claims, 9 Drawing Figures

PROSTHETIC ASPHERIC SPECTACLE LENS FOR APHAKIA

CROSS-REFERENCE TO RELATED APPLICATIONS

This is a continuation-in-part of earlier filed pending application, Ser. No. 831,814, filed Sept. 9, 1977 now abandoned.

FIELD OF THE INVENTION

The present invention relates to spectacle lenses for aphakic patients, and more specifically, to aspheric spectacle lenses for aphakic patients.

DESCRIPTION OF THE PRIOR ART

The present state of the art in the optical business recognizes the use of aspherical spectacle lens for aphakic patients. Aphakic vision is the condition of an eye after cataract surgery has been undertaken in which the lens of the eye is removed. The prior art use of aspheric lens for the aphakic patients is illustrated in the catalogue of Cataract Lens Laboratories, Inc., of Miami, Fla., dated Sept. 2, 1975. However, the prior art aspheric lens did not attempt to correct the sagital and tangential errors so as to eliminate the resulting spherical aberration and astigmatic errors inherent in the lens. To the contrary, prior art literature teaches that with an aspheric lens, the patient should be taught to move his head rather than his eyes and that lens manufacturers should not be overly concerned with sagital and tangential errors. In other words, the prior art aspheric lenses were able to improve angular peripheral vision when the aphakic patient's center vision was aligned with the center spherical portion of the aspheric lens by decreasing the diopter power of the outer peripheral portion. However, the aspheric lenses were inadequate to effectively compensate for the peripheral distortion when the patient's center vision was aligned with the outer peripheral, aspheric area of the lens. Consequently, the wearer of the prior art aspheric lens must rotate his head instead of his eyes. Therefore, concerning the aspheric lens, the prior art proclaimed that if the patient should move his eyes to look away from the central vision area of the lens, he would then observe dislocation which teaches the wearer or the patient to use his head so that rather than attempt to look and move the eyes away from the central vision portion of the lens to the side areas directly, he would rotate his head such that he would be still looking directly through the central vision area when he was looking at an object.

Accordingly, it can readily be seen that there is an unsolved need in the optical industry for an aphakia lens having asphericity in the outer peripheral portion which will not only give a clear field of vision for the centrally fixed eye, but will also allow the eye to rotate toward the periphery of the lens and use central vision to see clearly through the outer peripheral portion of the lens. More specifically, in a lens having asphericity, better central vision must be provided for a peripherally fixed eye, without reduction in angular peripheral vision for a centrally fixed eye.

SUMMARY

The present invention is directed toward a prosthetic, aspheric spectacle lens for aphakic patients, such lens comprising an anterior surface having a spherically zone and an aspheric peripheral zone surrounding the central zone.

The present invention includes an additional amount of flattening, and therefore additional asphericity, relative to a specific sized central zone than that found in the prior art aspheric lens designs.

The invention is based upon the discovery that by optimizing the amount of asphericity and central zone size of the spectacle lens for a given diopter base curve lens series, the improved aspheric spectacle lens has been able to overcome the previously described sagital and tangential errors of the prior art aspheric lens so as to eliminate the resulting aspherical aberration and astigmatic errors inherent in the prior art lenses. In eliminating such errors, the spectacle wearer may now, unlike with the prior art lenses, rotate his eyes toward the edge of the lens and use his central vision to see through the peripheral zone of the lens. This improved peripheral vision is accomplished without loss of a clear field of vision for the centrally fixed eye achieved by prior art aspheric lens designs.

DESCRIPTION OF THE DRAWINGS

Further objects and advantages of the present invention will become apparent as the following description proceeds, taken in conjunction with the accompanying drawigs in which.

DETAILED DESCRIPTION OF PREFERRED EMBODIMENT

Figure 1:
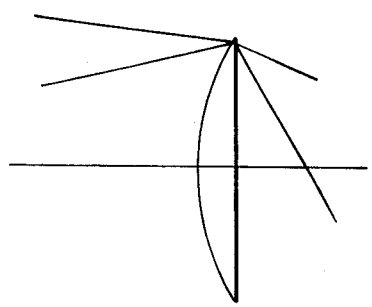
FIG. 1 illustrates marginal astigmatism.
Figure 5:
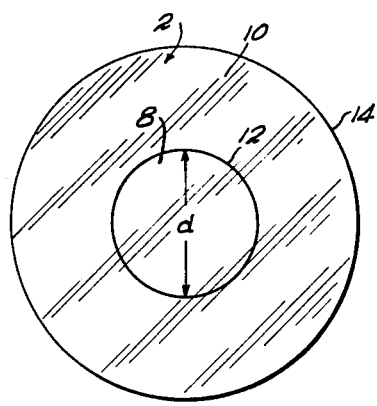
FIG. 5 is a front view of the aspheric spectacle lens of the present invention.
Figure 6:
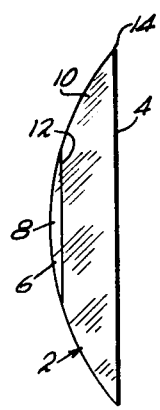
FIG. 6 is a side view of the aspheric spectacle lens of the present invention.

Referring to FIGS. 5 and 6, there is shown for the purposes of illustration of the preferred embodiment, a lens or lens blank 2, having a posterior surface 4 and an anterior surface 6. The posterior surface 6 is ground to a predetermined prescription for a particular aphakic patient in a conventional manner. The anterior surface 6 has a spherically curved central zone 8 and an aspheric peripheral zone 10 surrounding said central zone 8. As shown in FIG. 1, the central zone 8 is defined by a diameter, labeled d, and is spherically shaped having, preferably, a uniform diopter power of 10, 12, 14 or 16. Beginning at the inner circumferential edge 12 of the peripheral zone 10 immediately adjacent the central zone 8, the peripheral zone 10 begins with the same diopter power as the central zone 8. Proceeding radially outward toward the outer circumferential edge 14 of the peripheral zone 10, the diopter power radially decreases at a selected rate. Ideally, the lens blank 2 has the standard blank diameter ranging from 60 to 75 millimeters. It should be understood that any lens, not shown in the drawings, produced from the lens blank 2 will have a smaller diameter.

As previously explained, it is known in the optical art to produce a peripheral zone 8 to have an aspherical surface contour on the anterior surface 6 beginning at the inside circumferential edge and extending outward with diopter reduction to the outer circumferential edge. However, it has been discovered that with an approximate central zone size, together with the larger amounts of asphericity, there can be achieved a clear field of vision for the centrally fixed eye, while allowing the eye to rotate toward the edge of the lens 2 and use central vision to see clearly through the peripheral zone 10 of the lens blank 2. More specifically, it has been determined that with an additional amount of flattening that, when the eye rotates through the edge of the lens 2, one will see so clearly that it will not be necessary for the head to turn. This has never been heretofore possible due to inadequate amounts of asphericity in the previous aspheric lens designs. In other words the applicant has overcome the previously described inherent problems of previous aspheric lens designs.

Each diopter base curve lens series presently used in the optical industry has a central zone 8 having a standard uniform diopter curvature ranging from 12 to 16 diopters. For each diopter base curve using the standard sized blank 2 having an approximate 60–75 millimeter diameter, the applicant has determined the following optimum values. The +10.00 diopter base curve lens series has a rate of drop of 0.43 diopters per millimeters and the central zone base has a 27 millimeter diameter. The +12.00 diopter base curve lens series has a rate of drop of 0.45 diopter per millimeter, and the central zone base has a 26 millimeter diameter. The +16.00 diopter base curve lens series has a rate of drop of 0.51 diopter per millimeter, and the central zone base has a 23 millimeter diameter.

These series of base curve lens blanks differ from the previously known aspheric lens series in that this inventor not only has achieved a clear, wide field for the centrally fixed eye, but also has included an adequate amount of flattening for the rotating eye which uses central vision to view objects through the edge of the lens. In summary, the chart presents the approximate formula for asphericity for each series of base curve lens:

| BASE CURVE | RATIO OF DROP | CENTRAL ZONE SIZE | BLANK SIZE |
| --- | --- | --- | --- |
| +10.00 D. | 0.43 D. | 27 mm. | 62 mm. |
| +12.00 D. | 0.45 D. | 26 mm. | 62 mm. |
| +14.00 D. | 0.48 D. | 25 mm. | 62 mm. |
| +16.00 D. | 0.51 D. | 23 mm. | 62 mm. |

Under certain manufacturing conditions, the central zone 8 can be enlarged to as much as 35 millimeters. At this size, the diopter drop will never be less than 0.40 diopters per millimeter. If the central zone 8 is less than 35 millimeters, irrespective of the base curve, the diopter drop must not be less than 0.40 diopters per millimeter to achieve the purposes set fourth in the objects.

Figure 2:
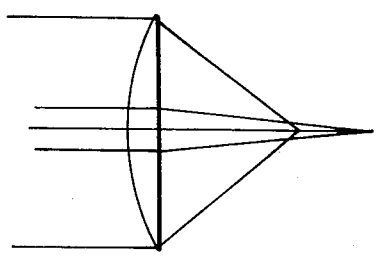
FIG. 2 illustrates spherical aberration.
Figure 3:
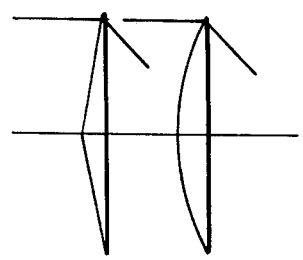
FIG. 3 illustrates prism deviation power.
Figure 4:
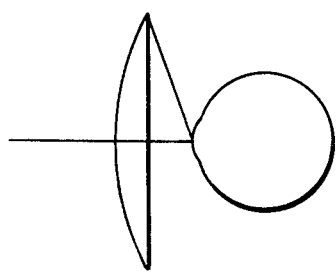
FIG. 4 illustrates the vertex distance error.

In deriving the values in the above chart, it was noted that four spectacle and patients' optical anomalies created a need for more asphericity than heretofore comtemplated in prior art aspheric lens designs, resulting in the patients now being able to rotate his eyes to look through the edge of the lenses, instead of having to turn his head. These four anomalies are illustrated in the drawings. FIG. 1 is a demonstration of marginal astigmatism in which peripheral rays of light are refracted too strongly due to their obliquity of incidence. FIG. 2 is a common error of spherical aberration, present in all high plus lenses. FIG. 3 illustrates the prism deviation power inherent in high plus lenses. FIG. 4 illustrates the vertex distance error created by the edge of the lens being further away from the eye than the center.

The above table was derived for a specific blank 2 size and a specific central zone 8 size. However, the blank 2 diameter may ideally vary from 60 to 75 millimeters and the central zone 8 diameter may ideally vary from 23 to 35 millimeters. However, it has been found that the diopter gradient or drop remains between 0.43 and 0.51 diopters for these variations.

In summary, a design of an aspheric distance field is disclosed which flattens from the edge of the central spherical zone 8 to the edge of the lens blank 2. The amount of asphericity has been designed for the centrally fixed eye to have clear and comfortable vision while viewing objects straight ahead through the central zone 8 of the lens 2, and also for the rotated eye which uses central vision to look through the peripheral zone 10 of the lens 2. The formula for the amount of asphericity to be used in the distance peripheral zone 10 of the lens 2 includes a correction for the sagital as well as the tangential errors to be found far out from the distance optical center toward the edge of high plus aphakic spectacle lenses. While correcting the sagital error as well as the tangential error clear vision is achieved, for the rotating eye using central vision to look through the edge of the lens 2 as well as clear vision for the centrally fixed eye which has peripheral vision entering through the edge of the lens 2 while looking at objects straight ahead through the distance optical center.

DETAILED DESCRIPTION OF AN ALTERNATIVE EMBODIMENT

Figure 7:
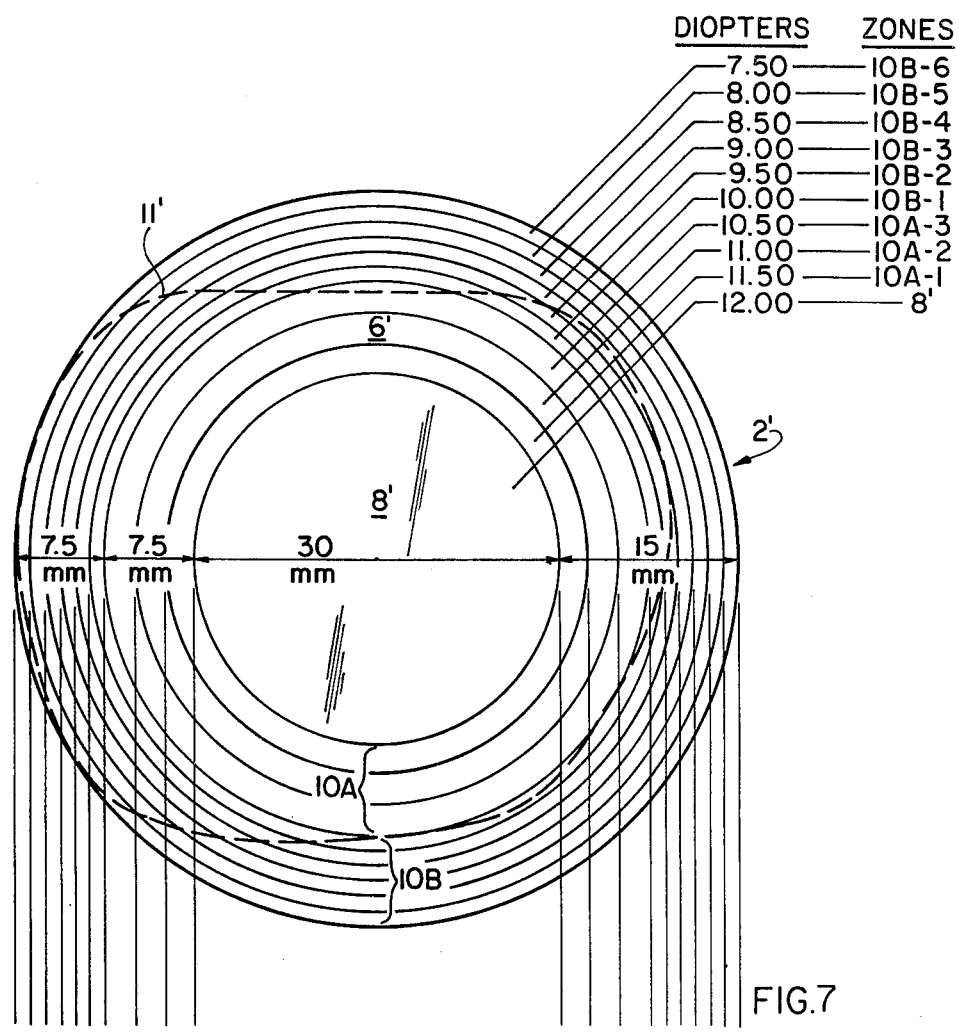
FIG. 7 is a front view of the aspheric spectacle lens of an alternative embodiment.
Figure 8:
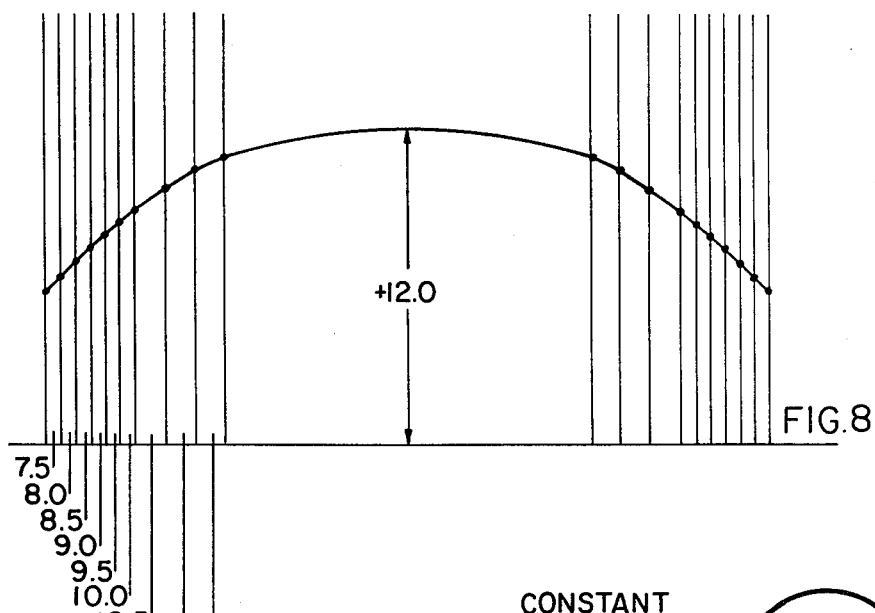
FIG. 8 is a graphical presentation of the diopter powers appearing radially across the anterior surface of an alternative embodiment.
Figure 9:
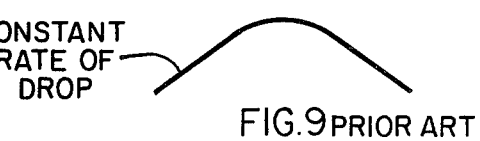
FIG. 9 is a graphic presentation of the diopter powers appearing radially across a typical lens of the prior art.

Referring now to FIGS. 7 and 8, there is shown for purposes of illustration, an alternative embodiment. FIG. 7 is a front plan view of the anterior surface 6' of a 66 mm diameter lens 2'. FIG. 8 schematically details a profile of the diopter power appearing radially at selected points across the anterior surface 6' of the lens 2'.

Turning now to FIG. 7, there is shown a 30 mm diameter spherically curved central zone 8' surrounded by a first, or intermediate, aspheric zone 10A, and a second, or outer, aspheric zone 10B. Both anterior zone 10A and outer zone 10B have a radial diameter of 7½ mm.

The intermediate zone 10A is shown as subdivided into three concentric rings, 10A-1, 10A-2, and 10A-3. Each ring is therefore 2½ mm in radial diameter. The outer zone 10B is shown as subdivided into 6 concentric rings, 10B-1, 10B-2, 10B-3, 10B-4, 10B-5 and 10B-6. Each ring is therefore approximately 1¼ mm in radial diameter.

It has been found that limitations inherent in conventional lens grinding restrict the drop in magnifying power between abutting annular rings to approximately ½ dopter. Therefore, in the illustrated example, the diopter power of each ring is ½ diopter less than that of the preceding ring. Thus the central zone 8' has a diopter power of 12, and intermediate zone ring 10A-1 has a diopter power of 11.5. Given that a 0.5 drop in diopter power occurs over a 2.5 mm range, it is algebraically calculated that a 0.2 drop per millimeter in diopter power occurs in each of the 7½ mm of the intermediate zone 10A.

To achieve the important object of allowing aphakic patients to rotate their eyes in lieu of head rotation, the outer zone 10B is provided with greater amounts of flattening than that of zone 10A.

The requisite additional amounts of asphericity are introduced by sub-dividing zone 10B into six concentric rings, each ring having a radial diameter of 1¼ mm. Thus, even though the drop in diopter power between each abutting ring is still ½ diopter, due to the grinding limitations, the drop in diopter power per millimeter is effectively doubled.

Given that a 0.5 drop in diopter power occurs over a 1¼ mm range, it is calculated that a 0.4 diopter drop occurs over each radial millimeter. Hence, in this illustrated embodiment, the intermediate zone 10A has a diopter drop of 0.2 diopters per millimeter, and the outer zone 10B has a diopter drop of 0.4 diopters per millimeter.

It is understood that the drop in diopter power between abutting rings (and within a given ring) is gradual, as opposed to precipitous. Abrupt drops in diopter powers between abutting rings introduces undesirable distortion.

FIG. 8 illustrates the gradual change in diopter power that occurs over the face of the anterior portion 6'. There will be seen that the decrease in average diopter power between abutting rings produces a step-like graphical figure. The inclination of the steps increases as the circumferential edge of the lens 2' is approached, i.e., the inclination of the steps increases radially from zone 10A to zone 10B. Additional amounts of flattening, or increased amounts of asphericity, are thus depicted, as between zones 10A and 10B. For ease of illustration, this embodiment shows a 2:1 rate of diopter drop per millimeter ratio between the zones. The exact rate is not critical, although desirable, nor is the exact diameter of the central zone or radius of the intermediate or outer zone critical.

The generally parabolic line of FIG. 8 graphically illustrates the actual diopter power at each point on the anterior surface 6' of lens 2' for this embodiment.

In FIG. 7, the rings are analogous to contour lines in that each ring connects points on the anterior surface 6' of the lens 2' having equal diopter powers. Contour lines lie on all points of topography having equal elevations. Just as relatively closely-spaced contour lines indicate a steep slope, wherein great changes in elevation occur in short horizontal distances, the relatively closely-spaced rings of zone 10B relative to 10A indicate that changes in diopter power are occuring at greater relative rates in zone 10B than in zone 10A.

The broken line 11' surrounds the portion of the lens blank 2' that is fitted into a pair of spectacles. That portion of the lens blank 2' lying outside the zone defined by broken line 11' is discarded in the course of the lens manufacturing process.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A spectacle lens blank for aphakic eye, comprising:
a lens body having a posterior surface and an anterior surface,
said anterior surface having a spherically curved central zone and an aspheric peripheral zone surrounding said central zone,
said central zone having a uniform diopter curvature between +10 to +16 diopters,
said peripheral zone having a diopter curvature the same as said central zone immediately adjacent thereto and radially decreasing in diopter power at a rate of change between 0.40 to 0.51 diopters per millimeter,
whereby said approximate central zone together with sufficient amounts of asphericity allows for a clear field of vision for a centrally fixed eye, yet allows the eye to rotate toward the edge of said spectacle lens and use central vision through said peripheral zone of said spectacle lens.

2. The spectacle lens of claim 1,
said lens blank having a diameter between 60 to 75 millimeters.

3. The spectacle lens of claim 1,
said central zone having a diameter between 23 and 35 millimeters.

4. The spectacle lens of claim 1,
said central zone having said uniform diopter curvature of approximately +10 diopters,
said peripheral zone having said rate of change of approximately 0.43 diopter per millimeter.

5. The spectacle lens of claim 4,
said lens blank having a diameter between 60 to 75 millimeters and said central zone having a diameter between 23 and 35 millimeters.

6. The spectacle lens of claim 1,
said central zone having said uniform diopter curvature of approximately +12 diopters,
said peripheral zone having said rate of change of approximately 0.45 diopters per millimeter.

7. The spectacle lens of claim 6,
said lens blank having a diameter between 60 and 75 millimeters and said central zone having a diameter between 23 and 35 millimeters.

8. The spectacle lens of claim 1,
said central zone having said uniform diopter curvature of approximately +14 diopters,
said peripheral zone having side rate of change of approximately 0.48 diopter per millimeter.

9. The spectacle lens of claim 8,
said lens blank having a diameter between 60 and 75 millimeters and said central zone having a diameter between 23 and 35 millimeters.

10. The spectacle lens of claim 1,
said central zone having said uniform diopter curvature of approximately +16 diopters,
said peripheral zone having said rate of change of approximately 0.51 diopter per millimeter.

11. The spectacle lens of claim 10,
said lens blank having a diameter between 60 and 75 millimeters and said central zone having a diameter between 23 and 35 millimeters.

12. In the spectacle lens of claim 1,
in which the rate of drop never is less than 0.40 diopters per millimeter.

13. The spectacle lens of claim 1, in which:
the base curve is in the range of +12 to +14 diopters, and
the rate of drop is within the range of 0.40 diopters and 0.51 diopters per millimeter.

14. A spectacle lens blank for aphakic eyes, comprising:
 a lens body having a posterior surface and an anterior surface,
 said anterior surface having a spherically curved central zone; an intermediate aspheric pheripheral zone surrounding said central zone, and an outer aspheric peripheral zone surrounding said intermediate aspheric peripheral zone,
 said central zone having a uniform diopter curvature between +10 to +16 diopters,
 said intermediate peripheral zone having a diopter curvature the same as said central zone immediately adjacent thereto and radially decreasing in diopter power at a preselected rate of change,
 said outer peripheral zone having a diopter curvature the same as said intermediate zone immediately adjacent thereto and radially decreasing in diopter power at a preselected rate of change greater than that rate of diopter change in said intermediate peripheral zone,
 whereby the increasing amounts of asphericity exhibited in said outer zone relative to the amount of asphericity in the intermediate zone, allows the wearer of the lens to rotate his eyes towards the edge of the spectacle lens with a reduced distortion of the viewed object.

15. In the spectacle lens blank of claim 14,
 wherein the rate of change in diopter power appearing in the outer zone is approximately double that of the intermediate zone.

16. In the spectacle lens blank of claim 14,
 wherein the rate of change in diopter power appearing in both the intermediate and the outer zones is non-uniform, characterized by an acceleration in the rate of change toward increasing amounts of asphericity as a circumferential edge of the lens blank is approached.

* * * * *